(12) United States Patent
Bassett et al.

(10) Patent No.: US 7,068,872 B2
(45) Date of Patent: Jun. 27, 2006

(54) SIGNAL PROCESSING FOR PASSIVE INTERFEROMETRY

(75) Inventors: Ian Bassett, Wollstonecraft (AU); John Haywood, East Gosford (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 10/481,159

(22) PCT Filed: Jun. 25, 2002

(86) PCT No.: PCT/AU02/00820

§ 371 (c)(1),
(2), (4) Date: May 24, 2004

(87) PCT Pub. No.: WO03/002932

PCT Pub. Date: Jan. 9, 2003

(65) Prior Publication Data

US 2004/0189997 A1   Sep. 30, 2004

(30) Foreign Application Priority Data

Jun. 28, 2001   (AU) ..................... PR5994

(51) Int. Cl.
G02B 6/26 (2006.01)
G01L 1/24 (2006.01)
(52) U.S. Cl. ...................... 385/15; 356/35.5
(58) Field of Classification Search ........... 385/15; 356/450–521
See application file for complete search history.

(56) References Cited

U.S. PATENT DOCUMENTS

| 5,071,214 A | | 12/1991 | Jacob et al. |
| 5,080,488 A | | 1/1992 | Buehler et al. |
| 5,777,737 A | | 7/1998 | Priest |
| 5,838,438 A | * | 11/1998 | Peale et al. ................. 356/451 |
| 5,946,429 A | | 8/1999 | Huang et al. |
| 6,097,486 A | * | 8/2000 | Vakoc et al. ................. 356/477 |

FOREIGN PATENT DOCUMENTS

DE   4403929   2/1994

* cited by examiner

Primary Examiner—Michelle Connelly-Cushwa
Assistant Examiner—Tina M. Wong
(74) Attorney, Agent, or Firm—Townsend and Townsend and Crew LLP

(57) ABSTRACT

A method of conducting passive interferometry utilizing an optical coupler having N bidirectional input/output ports as an interferometer head, the method comprising the steps of for each of said ports, inserting an optical input signal into the port utilizing an optical network and measuring a corresponding optical output at each of the ports utilizing the optical network, forming products containing at least some of the $N^2$ optical outputs each, wherein the products are chosen such that each of the products comprises the same network dependent factor and eliminating the network dependent factor to obtain substantially network independent measurements.

15 Claims, 2 Drawing Sheets

SIGNAL PROCESSING FOR PASSIVE INTERFEROMETRY

FIELD OF THE INVENTION

The present invention relates broadly to a method of conducting passive interferometry utilizing an optical coupler as beam splitter/recombiner and to an apparatus for conducting passive interferometry utilising an optical coupler as beam splitter/recombiner.

BACKGROUND OF THE INVENTION

Passive two beam interferometry employs an N×N coupler to split and recombine the beams. The object of two beam interferometry is to measure the phase difference between the two interfering beams, which in turn becomes a measure for a quantity which is to be measured in various measurement fields including e.g. optical gyroscopes and current measuring devices. With N>2, it is possible to avoid the situation in which the output intensities are simultaneously stationary with respect to the phase difference, and it is thus unnecessary to use an active phase shifter, hence the name passive interferometry.

Passive interferometry may be preferable to active interferometry in many applications, for example if the interferometer head is at high voltage.

In interrogating the N×N coupler of a passive two beam interferometer, typically a pulsed light source is used for inserting optical signals into the N×N coupler. A suitable optical network splits each signal pulse from the pulse source into N pulses, one for each of the N input ports of the coupler.

Each one of the N input pulses gives rise to N output pulses, giving $N^2$ output pulses in all, and the delays in the optical network are typically such that the $N^2$ pulses arrive at different times at a detector, and can therefore be distinguished.

A light pulse from the source reaches each of the ports of the coupler with some loss of intensity, which in general will be in part due to variations in the source power relative to a nominal source power. Similarly, a light pulse leaving a port of the coupler reaches the detector with a further loss factor, which also will in general be in part due to variations in the detector sensitivity relative to a nominal value for this sensitivity. Furthermore, the interferometer head is characterised by values of intensity transfer factors from each input port to each output port.

In order to obtain useful measurements utilizing passive two beam interferometry, it has thus far been necessary to conduct a temperature dependent calibration process to determine the effect of loss factors and intensity transfer factors. This has the disadvantages of (a) additional i.e. calibration processing steps being required in utilizing passive interferometry in the various measurement fields, and (b) the necessity to repeat calibration periodically to account for changes in e.g. the environment in which the passive interferometer is used.

In at least preferred embodiments, the present invention seeks to provide an improved signal processing for passive interferometry which can avoid those disadvantages.

SUMMARY OF THE INVENTION

In accordance with a first aspect of the present invention there is provided a method of conducting passive interferometry utilizing an optical coupler having N bi-directional input/output ports as beam splitter/recombiner, the method comprising the steps of, for each of said ports, inserting an optical input signal into the port utilizing an optical network and measuring a corresponding optical output at each of the ports utilizing the optical network; forming products containing at least some of the $N^2$ optical outputs each, wherein the products are chosen such that each of the products comprises the same network dependent factor, and eliminating the network dependent factor to obtain substantially network independent measurements.

Preferably, the method is conducted in a manner such that changes in the optical network are slow in comparison with the time required to measure the corresponding optical outputs.

Advantageously, a substantially monochromatic light source is utilized to insert the optical input signals.

Where a broad light source is utilized, the method preferably comprises utilizing wavelength flattened optical couplers in the optical network.

The step of eliminating the network dependent factor may comprise forming independent ratios of the products.

The step of forming each product may comprise forming the geometric mean of the factors.

The optical coupler utilized for the interferometry may comprise a 3×3 optical coupler.

The interferometry may comprise Sagnac interferometry or Michelson interferometry.

In accordance with a second aspect of the present invention there is provided an apparatus for conducting passive interferometry utilizing an optical coupler having N bi-directional input/output ports as beam splitter/recombiner, the apparatus comprising an optical network which comprises an optical input unit for inserting an optical input signal into each port and a detector unit for measuring corresponding optical outputs at each of the ports when an optical input is inserted into one of the ports; a processing unit arranged, in use, such that products containing at least some of the $N^2$ optical outputs each are formed and such that the products are chosen so that each of the products comprises the same network dependent factor, and further arranged, in use, to eliminate the network dependent factor to obtain substantially network independent measurements.

Advantageously, the optical input unit comprises a substantially monochromatic light source.

Where the optical input unit comprises a broad light source, the optical network preferably comprises wavelength flattened optical couplers.

The processing unit may be arranged, in use, such that the eliminating of the network dependent factor comprises forming independent ratios of the products.

The processing unit may be arranged, in use, such that the forming of each product comprises forming the geometric mean of the factors.

The optical coupler utilized for the interferometry may comprise a 3×3 optical coupler.

The interferometry may comprise Sagnac interferometry or Michelson interferometry.

BRIEF DESCRIPTION OF THE DRAWINGS

Preferred forms of the present invention will now be described, by way of example only, with reference to the accompanying drawings.

DETAILED DESCRIPTION OF THE EMBODIMENTS

The preferred embodiments described provide an improved signal processing for passive interferometry which can provide useful measurements without the necessity of conducting a calibration process.

Figure 1:
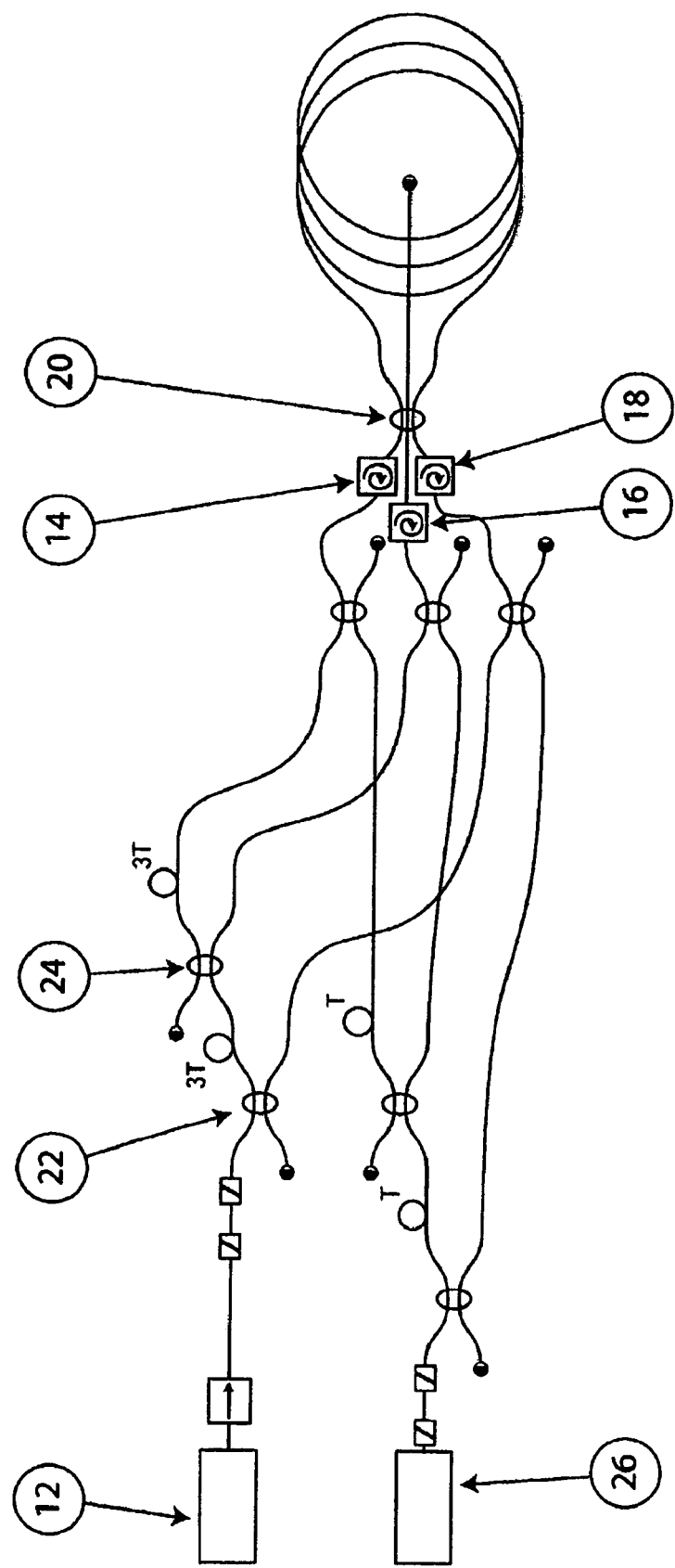
FIG. 1 is a schematic drawing of a set-up for Sagnac interferometry embodying the present invention.

FIG. 1 shows the set up of a 3×3 Sagnac interferometer 10 embodying the present invention.

A light pulse from the source 12 reaches port j (i.e. bi-directional ports 14, 16, or 18) of the coupler 20 with some loss of intensity. This loss may be expressed by a loss factor $s_j$. This loss factor occurs primarily because the light is split at couplers e.g. 22 en route, but also from excess loss in these couplers e.g. 22, and from losses in transmission between couplers e.g. 22, 24. The loss factor $s_j$ is also to be understood to include variations in the power of source 12 relative to a nominal source power. Similarly, a light pulse leaving port k (i.e. bi-directional ports 14, 16 or 18) reaches the detector 26 with a further loss factor $d_k$, which is to be interpreted as including variations in the coupler 20 sensitivity of the detector 26 relative to a nominal value for this sensitivity.

The interferometer head is characterised by the values for the intensity transfer factors $\rho_{jk}$ from port i to port k, (i=1 ... 3, k=1 ... 3). All the actually measured information consists of the 3×3=9 intensities which include the loss factors s and d:

$$P_{jk} = s_j \rho_{jk} d_k (i=1, \ldots 3; j=1, \ldots 3)$$

The general principle for digital processing of the received signals embodying the present invention is as follows. The received intensities $P_{jk}$ are formed into sets of products with the property that each such product involves the same s and d factors. In one embodiment the three products $P_{11}P_{22}P_{33}$, $P_{12}P_{23}P_{31}$, and $P_{21}P_{32}P_{13}$ have as a common factor $s_1 s_2 s_3 d_1 d_2 d_3$. In another embodiment, the set of products is $P_{12}P_{21}P_{33}$, $P_{13}P_{31}P_{22}$, and $P_{23}P_{32}P_{11}$, which again have as a common factor $s_1 s_2 s_3 d_1 d_2 d_3$.

The information about the phase shift T inferred in the interferometer 10 during a measurement is then obtained from the ratios of products with the same common factor. In the preferred embodiment such ratios are independent of the network properties, and thus unaffected by changes in splitting ratios, birefringence, and losses in the network. In the preferred embodiment, the changes in the network are slow in comparison with the period (time between pulses) of the source 12, and the source 12 is monochromatic. With a broad source, in an alternative embodiment, wavelength flattened couplers are used in the network and perturbations to the network will then have at least a small effect. It can be shown that this effect in such an alternative embodiment is quadratically small in any small departures from wavelength-independence in the losses and splitting ratios in the network.

Returning to the preferred embodiment in FIG. 1, for Sagnac interferometry with a 3×3 coupler 20, the three products $P_{11}P_{22}P_{33}$, $P_{12}P_{23}P_{31}$, and $P_{21}P_{32}P_{13}$ are used, and geometric means are formed:

$$P_+ = (P_{12}P_{23}P_{31})^{1/3} = (s_1 s_2 s_3 d_1 d_2 d_3)^{1/3} (\rho_{12}\rho_{23}\rho_{31})^{1/3}$$

$$P_- = (P_{21}P_{32}P_{13})^{1/3} = (s_1 s_2 s_3 d_1 d_2 d_3)^{1/3} (\rho_{21}\rho_{32}\rho_{13})^{1/3}$$

$$P_0 = (P_{11}P_{22}P_{33})^{1/3} = (s_1 s_2 s_3 d_1 d_2 d_3)^{1/3} (\rho_{11}\rho_{22}\rho_{33})^{1/3}$$

Then appropriate ratios are formed, from which the common factor $(s_1 s_2 s_3 d_1 d_2 d_3)^{1/3}$ drops out. For a perfect 3×3 coupler, the quantities $\rho_{12}\rho_{23}\rho_{31}$ are equal and have the form $A + B \cos(\Psi + \theta_0)$:

$$\rho_{12} = \rho_{23} = \rho_{31} = \rho_+^{(0)} = A + B \cos(\Psi + \theta_0)$$

where $\theta_0$ may be taken to be $2\pi/3$. Further, for a perfect coupler $$\rho_{21} = \rho_{32} = \rho_{13} = \rho_-^{(0)} = A + B \cos(\Psi - \theta_0)$$

and $$\rho_{11} = \rho_{22} = \rho_{33} = \rho_0^{(0)} = A + B \cos \Psi$$

It can be shown that, for a coupler with small imperfections, the geometric means such as $\overline{\rho_+} = (\rho_{12}\rho_{23}\rho_{31})^{1/3}$ are equal to first order of small quantities to the corresponding ideal values such as $\rho_+^{(0)}$, or $$\overline{\rho_+} = \rho_+^{(0)} + \text{second order}, \quad \overline{\rho_-} = \rho_-^{(0)} + \text{second order},$$
$$\overline{\rho_0} = \rho_0^{(0)} + \text{second order}$$

Thus, correct to first order, the ratios of measured intensities formed from which the common factor $(s_1 s_2 s_3 d_1 d_2 d_3)^{1/3}$ has been dropped are:

$$\frac{P_+}{P_0} = \frac{A + B \cos(\Psi + \vartheta_0)}{A + B \cos \Psi} = \frac{1 + \alpha \cos(\Psi + \vartheta_0)}{1 + \alpha \cos \Psi}$$

$$\frac{P_-}{P_0} = \frac{A + B \cos(\Psi - \vartheta_0)}{A + B \cos \Psi} = \frac{1 + \alpha \cos(\Psi - \vartheta_0)}{1 + \alpha \cos \Psi}$$

where $\alpha = B/A$. The quantity $\alpha$ can eliminated from the above two equations and the phase shift $\Psi$ obtained. This estimate of $\Psi$ is substantially independent of the interrogation network and is corrected to first order of small quantities for any small error in the 3×3 coupler 20.

In the following, consideration will briefly be given to the reciprocity of the Sagnac interferometry embodying the present invention shown in FIG. 1. If the measurand is zero (e.g. no current penetrating the Sagnac loop and no rotation), then $\rho_+ = \rho_-$ and consequently it is also true that the ratio of actually measured intensities is equal to 1.

$$\frac{P_+}{P_-} = 1$$

Thus the zero error of the interferometer embodying the present invention is therefore zero, apart from the (quadratically small) effects of small wavelength dependence of s and d factors over the source spectrum.

Figure 2:
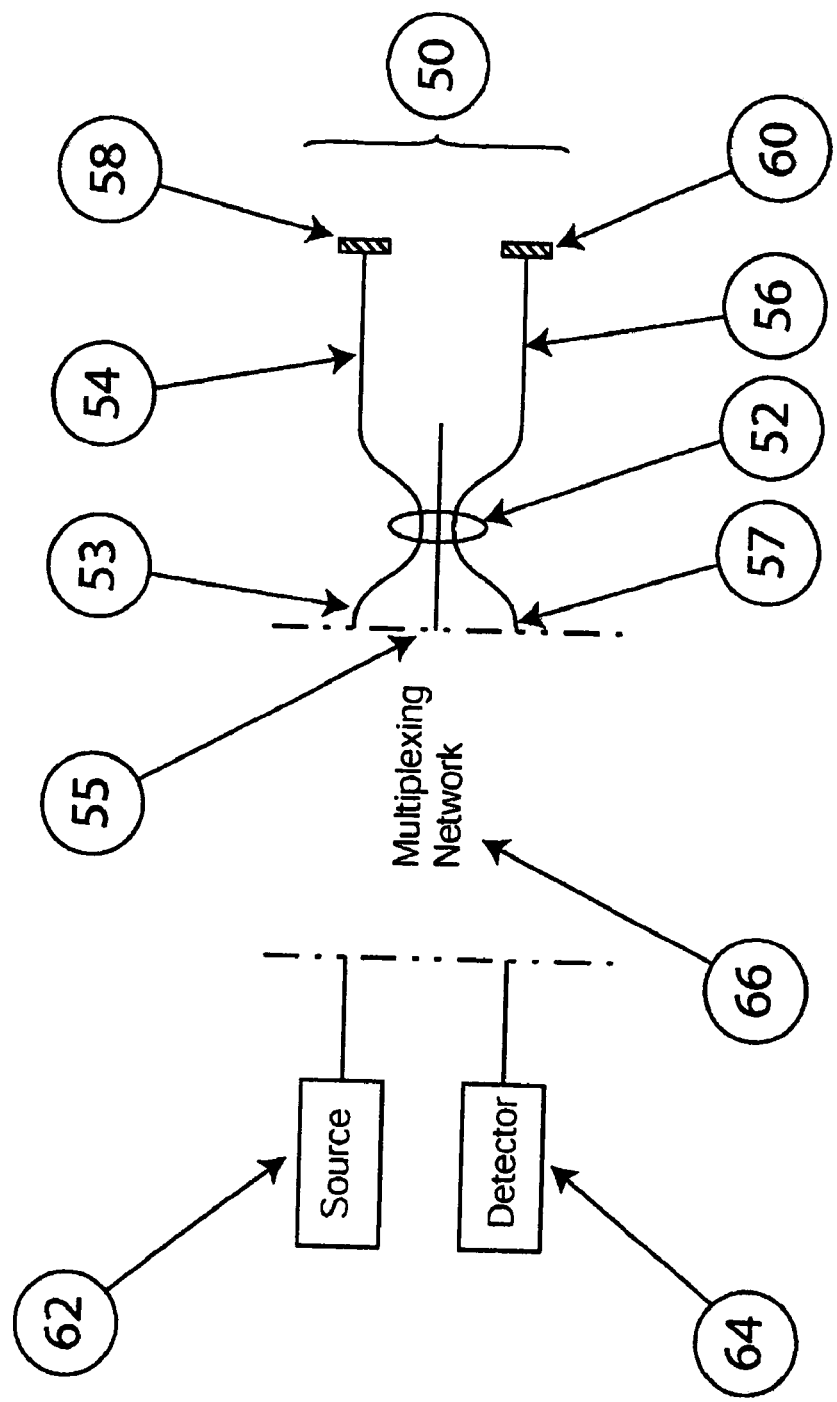
FIG. 2 is a schematic drawing of a set-up for Michelson interferometry embodying the present invention.

In FIG. 2 a Michelson interferometer 50 embodying the present invention is shown. In this embodiment the interferometer 50 has two arms 54, 56, each ending in a mirror 58, 60 respectively. It is noted that in other embodiments the two arms 54, 56 may not be physically separate, but can consist of two polarization states in a birefringent fiber, or more generally two modes in a multimode fiber. Again, a 3×3 coupler 52 is utilized as the interferometer head, with bidirectional ports 53, 55, 57. A light source 62 and detector 64 form part of the interrogation network 66.

In the embodiment shown in FIG. 2 the appropriate products of measured intensities are $P_{12}P_{21}P_{33}$, $P_{13}P_{31}P_{22}$, and $P_{23}P_{32}P_{11}$, and the corresponding geometric means of the intensities $\rho_{ik}$ are $$\bar{\rho}_3=(\rho_{12}\rho_{21}\rho_{33})^{1/3}, \bar{\rho}_1=(\rho_{23}\rho_{32}\rho_{11})^{1/3},$$
$$\bar{\rho}_2=(\rho_{31}\rho_{13}\rho_{22})^{1/3}$$

Any two independent ratios of these three quantities are equal to the corresponding ratios of geometric means of the measured intensities. These ratios are, to first order in any small errors in the coupler 52, equal to those which would be produced by a perfect coupler, apart from an addition (by a first order quantity) to the drift term in the phase $\Psi$. As usual in Michelson interferometry, the measured phase shift is the sum of two terms $$\Psi=\Psi_s+\Psi_d$$

where $\Psi_s$ is the signal phase shift and $\Psi_d$ is a (slowly varying) drift phase shift.

It will be appreciated by the person skilled in the art that numerous modifications and/or variations may be made to the present invention as shown in the specific embodiments without departing from the spirit or scope of the invention as broadly described. The present embodiments are, therefore, to be considered in all respects to be illustrative and not restrictive.

For example, whilst the present invention has been described herein with reference to a 3×3 coupler utilized in either Sagnac or Michelson interferometry it will be appreciated that the present invention is not limited to those embodiments. Rather, the present invention can be generalized to interrogation of N×N couplers in passive interferometry.

In the claims that follow and in the summary of the invention, except where the context requires otherwise due to express language or necessary implication the word "comprising" is used in the sense of "including", i.e. the features specified may be associated with further features in various embodiments of the invention.

The invention claimed is:

1. A method of conducting passive interferometry utilizing an optical coupler having N bi-directional input/output ports as an interferometer head, the method comprising the steps of:
    for each of said ports
        inserting an optical input signal into the port utilizing an optical network and
        measuring a corresponding optical output at each of the ports utilizing the optical network;
    forming products containing at least some of the $N^2$ optical outputs each, wherein the products are chosen such that each of the products comprises the same network dependent factor; and
    eliminating the network dependent factor to obtain substantially network independent measurements.

2. A method as claimed in claim 1, wherein the method is conducted in a manner such that changes in the optical network are slow in comparison with the time required to measure the corresponding optical outputs.

3. A method as claimed in claim 1, wherein a substantially monochromatic light source is utilized to insert the optical input signals.

4. A method as claimed in claim 1, wherein, where a broad light source is utilized, the method comprises utilizing wavelength flattened optical couplers in the optical network.

5. A method as claimed in claim 1, wherein the step of eliminating the network dependent factor comprises forming independent ratios of the products.

6. A method as claimed in claim 1, wherein the step of forming each product comprises forming the geometric mean of the factors.

7. A method as claim in claim 1, wherein the optical coupler utilized for the interferometry comprises a 3×3 optical coupler.

8. A method as claimed in claim 1, wherein the interferometry comprises Sagnac interferometry or Michelson interferometry.

9. An apparatus for conducting passive interferometry utilizing an optical coupler having N bi-directional input/output ports as an interferometer head, the apparatus comprising:
    an optical network which comprises an optical input unit for inserting an optical input signal into each port and a detector unit for measuring corresponding optical outputs at each of the ports when an optical input is inserted into one of the ports;
    a processing unit arranged, in use, such that products containing at least some of the $N^2$ optical outputs each are formed and such that the products are chosen so that each of the products comprises the same network dependent factor, and further arranged, in use, to eliminate the network dependent factor to obtain substantially network independent measurements.

10. An apparatus as claim in claim 9, wherein the optical input unit comprises a substantially monochromatic light source.

11. An apparatus as claim in claim 9, wherein the optical input unit comprises a broad light source, and the optical network comprises wavelength flattened optical couplers.

12. An apparatus as claim in claim 9, wherein the processing unit is arranged, in use, such that the eliminating of the network dependent factor comprises forming independent ratios of the products.

13. An apparatus as claimed in claim 9, wherein the processing unit is arranged, in use, such that the forming of each product comprises forming the geometric mean of the factors.

14. An apparatus as claimed in claim 9, wherein the optical coupler utilized for the interferometry comprises a 3×3 optical coupler.

15. An apparatus as claim in claim 9, wherein the interferometry comprises Sagnac interferometry or Michelson interferometry.

* * * * *